INVENTOR
H. HUME MATHEWS
BY
Larry R. Cassett
ATTORNEY

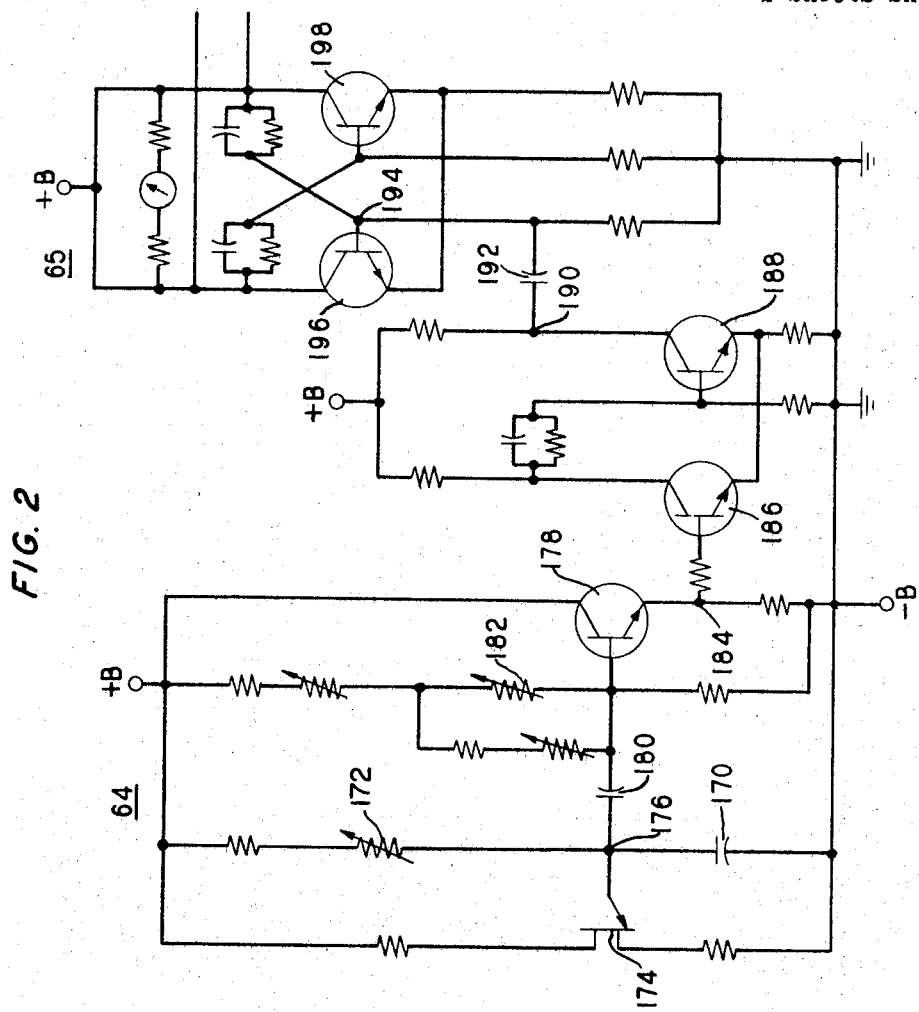
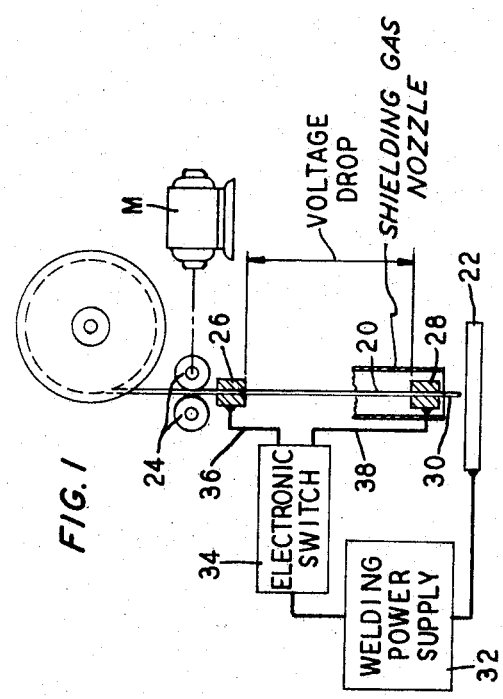

United States Patent Office 3,518,401
Patented June 30, 1970

3,518,401
ELECTRIC ARC PULSING
Howard Hume Mathews, Boonton Township, N.J., assignor to Air Reduction Company, Incorporated, New York, N.Y., a corporation of New York
Filed Oct. 4, 1967, Ser. No. 672,862
Int. Cl. B23k 9/10
U.S. Cl. 219—131        4 Claims

ABSTRACT OF THE DISCLOSURE

Welding power is supplied to the arc alternately by way of a first contact tube close to the arc-sustaining tip of the welding electrode and a second contact tube relatively remote from said tip, the frequency of alternation and the relative time of dwell of the power on the two contact tubes being determined by a resistor-capacitor timing circuit together with a pair of saturable transformers controlling rectifiers in circuit with the respective contact tubes.

---

Figure 3:
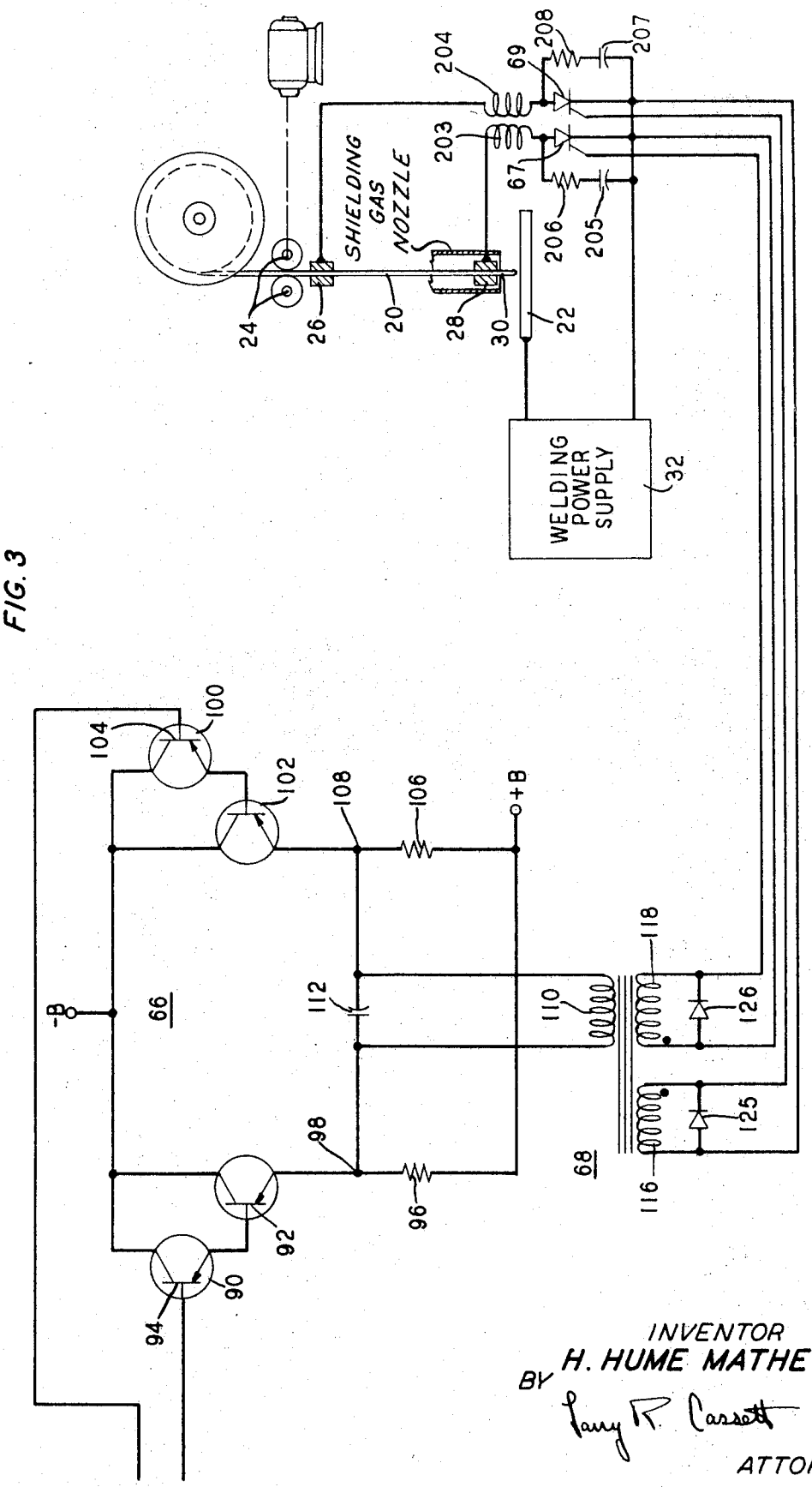

This invention relates to means and methods for producing a pulsing effect in the current passing through an electric arc, and more particularly to the production of said effect with a conventional welding power source.

Two welding methods, both of which may be characterized as pulsating or intermittent in mode of operation, have come into wide use in the welding industry. One of these methods is commonly known as pulsed power welding and is disclosed and claimed in Pat. 3,071,680, issued Jan. 1, 1963 to N. E. Anderson and William J. Greene, which patent is owned by the assignee herein. The other method is known as dip transfer welding and is described and claimed in Pat. 2,886,696, issued May 12, 1959, to Roger W. Tuthill and Alanson U. Welch, which patent is also owned by the assignee herein. Both of these methods involve the use of pulsating arc current and require in effect the application of a pulsating voltage across the arc.

In the pulsed power welding method, an especially modified welding current source has been employed to effect the desired pulsing of the arc voltage. On the other hand, in the dip transfer method, the pulsing rate has been somewhat irregular, depending upon properties of the welding circuit, for example inductance and capacitance, whereas it is desired to have a more positive control over the pulsing rate.

The present invention is applicable to both of the above identified welding methods but its use is not to be construed as limited to these applications.

In accordance with the invention, the use of a special welding current source is avoided, and the pulsing rate is placed under rigid control by the use of switching or commutating means independent of the circuit parameters of the welding current circuit.

An object of the invention is to vary the welding voltage and current in a pulsing manner without providing a welding power generator of pulsating voltage.

Another object is to effect pulsing without wasting power in a variable resistor which serves no other useful purpose than to dissipate electrical power in the form of heat.

Another object is to avoid the need for electrical resonance in the welding current supply circuit involving inductance and capacitance, in order to establish pulsations and to determine the frequency of such pulsations.

A general object is to facilitate the control of heat input into the weld pool in a welding process which employs a pulsed power process, a dip transfer process of metal deposition from a consumable welding wire, or other process involving pulsating arc power.

A feature of the invention is the use of two points of electrical contact (hereinafter referred to as contact tubes) for use alternately in impressing welding current upon the welding electrode, one contact tube being located relatively close to the arc-sustaining tip of the electrode and the other contact tube being located relatively remote from the said tip.

A related feature is the use of the electrical resistance of the electrode between the two contact tubes as a resistor for reducing the welding current between periods of maximum welding current, the heat generated in this portion of the welding electrode being used in heating the electrode during periods of reduced welding current.

Another feature is an improved method of predetermining the frequency of pulsation of the welding current.

Other features, objects and advantages will appear from the following more detailed description of an illustrative embodiment of the invention, which will now be given in conjunction with the accompanying drawings.

In the drawings,

FIG. 1 is a schematic diagram of an embodiment of the invention, showing a block representing electronic switching means; and FIGS. 2 and 3, when placed side by side, form a schematic diagram of the embodiment of FIG. 1 including details of the electronic switching means.

FIG. 1 shows a welding electrode 20 in the form of a consumable wire, arranged to be driven toward a workpiece 22 by means of feed rolls 24, at least one of which rolls is assumed to be driven, preferably at a substantially constant rate, by a source of motive power. Two contact tubes 26 and 28 are shown for impressing welding current upon the electrode 20. The contact tube 26 is located remote from the arc-supporting tip 30 of the electrode 20, while the contact tube 28 is located relatively close to the tip 30. A source 32 of welding current is shown with one of its terminals connected to the workpiece 22 and its other terminal connected through an electronic switch 34 and leads 36 and 38, respectively, to the contact tubes 26 and 28. While the remote contact tube 26 is illustrated as in the welding head between the feed rolls 24 and the contact tube 28, it should be understood that this invention contemplates also an arrangement in which the remote contact tube is a great distance from the electrode tip to thereby introduce substantial resistance into the circuit.

In the operation of the arrangement shown in FIG. 1, the electronic switch 34 operates to deliver current from source 32 alternately to contact tubes 26 and 28. During intervals in which the current is delivered to the contact tube 28, maximum voltage occurs across the arc between the tip 30 and the workpiece 22, and during the intervals in which the current is delivered to the contact tube 26, welding current flowing along the electrode 20 is accompanied by a voltage drop between the two contact tubes, with the result that the voltage across the arc is decreased from the maximum by at least the amount of the voltage drop between the contact tubes. The result is a pulsing of the arc voltage, equivalent in effect to supplying welding current to the arc through the usual single contact tube from a special welding current source which generates a pulsating voltage.

This system employs a CAV welding current source which is commonly available and thereby permits pulsed arc welding without the need for a special welding current source. In addition, during the intervals in which current is impressed upon the contact tube 26, electrical energy from the source 32 is usefully employed in heating or maintaining a desired temperature in the electrode 20.

In arc welding using the spray mode of metal transfer, the energy input to the weld pool tends to run too high for certain applications, such as out of position welding or welding thin sections. Pulsed power permits reduction of this energy input without sacrificing the advantages of the spray process. Metal transfer takes place solely or mainly during the intervals of high arc voltage. During the intervals of low arc voltage, the weld pool tends to cool. By adjusting the relative lengths of the high voltage intervals and the low voltage intervals, the weld pool temperature can be adjusted to a suitable value.

In dip transfer welding, on the other hand, the weld pool temperature tends to run too low, resulting in poor joints. The present invention remedies this condition in two ways. First, during the interval when the arc is short-circuited, the welding current is supplied through the remote contact tube. The current and the voltage are held down to relatively low values due to the resistance of the electrode between the contact tubes. However, during this interval the electrode is receiving maximum warming due to the voltage drop between the electrodes. When the current switches to the closeup contact tube, the voltage increases suddenly, starting the arc. The arc voltage is maintained during this interval independently of any need for inductance in the circuit. Melting of the electrode occurs during this interval, but without metal transfer to the weld pool. When the current switches back to the remote contact tube, the voltage falls below what is required to sustain the arc and so the arc is extinguished and the feed mechanism moves the electrode into contact with the work. By suitable adjustment of the relative time intervals of the arc and the short circuit, the heat input to the weld pool can be made adequate to obtain satisfactory fusion and a good joint, aided by the extra warming introduced during the short circuit interval. Second, the frequency of short-circuiting can be adjusted to an optimum value for proper heating of the weld pool. In this respect, it has been found in practice that the temperature of the weld pool is raised by lowering the short-circuiting frequency. In the relatively unregulated circuits which depend upon inductance and capacitance for determining the frequency, the frequency tends to vary in an uncontrolled manner and tends to be too high on the average, thus unduly cooling the weld pool. In accordance with the invention, the short-circuiting frequency is maintained substantially constant by commutation or electronic switching.

Spray transfer or dip transfer may be selected, as desired. To obtain spray transfer, the maximum voltage supplied to the arc by way of the close-up contact tube 28 is made suitably large, as by selection of a welding current source of sufficiently high voltage. To obtain dip transfer, a welding current source of lesser voltage is used, or a lower voltage output may be obtained from the same welding current source (if adjustable) used for spray transfer by suitable adjustment of the output voltage of the source. In the latter case, the same apparatus may be used interchangeably in either process.

FIGS. 2 and 3 together show illustrative details of a gating circuit for accomplishing the required electronic switching or commutating in the arrangement of FIG. 1. The circuit comprises a sawtooth wave generating circuit 64, a wave shaping circuit 65, a differential amplifier 66, a saturable transformer 68, and a pair of silicon controlled rectifiers 67, 69. The connection of the gating circuit to the welding current supply 32 and to the contact tubes 26, 28 is also shown in FIG. 3, as in FIG. 1.

The gating circuit serves to render the rectifiers 67 and 69 alternately conductive, thereby switching the welding current alternately from contact tube 28 to contact tube 26 and back again at any desired frequency of alternation over a useful range of frequencies, and dwelling for a predetermined portion of each cycle upon each contact tube.

The sawtooth wave generator 64 includes means to provide effectively separate frequency adjustment and duty cycle adjustment. The wave shaping circuit 65 comprises means for sharpening the square wave form of the gating wave.

The frequency of gating is determined by regulating the charging rate of a timing capacitor 170 by means of an adjustable resistor 172. A unijunction transistor 174 is connected in shunt with the charging circuit and with a direct current source having terminals +B and —B. When a charge on the capacitor 170 from said source reaches the threshold potential of the transistor 174, the capacitor is discharged through the transistor and the charging cycle repeats, thereby generating a sawtooth wave at the junction 176 between the capacitor 170 and the resistor 172. The sawtooth wave is combined with an adjustable biasing potential upon the base electrode of a transistor 178 shown as being of NPN type. The junction 176 is capacitively coupled to the base of the transistor 178 by a relatively large capacitor 180. The bias potential for the transistor 178 is supplied by a voltage dividing network of resistors connected between +B and —B, the principal adjustable resistor being shown at 182. The resistor 182 is effective to determine the duty cycle. That is, the division of time between charge and discharge of the capacitor 170. The transistor 178 serves as an emitter follower generating an approximate form of the desired gating wave at the emitter junction 184.

The wave at the junction 184 is impressed upon the base electrode of a transistor 186, which transistor together with a similar transistor 188 forms a Schmitt trigger which generates an amplified replica of the approximated gating wave, but with reversed polarity, providing low potential when the gating wave is high potential and high potential when the gating wave is low potential. This gives a desired phase reversal of the gating wave, the phase-reversed wave appearing at the collector terminal 190 of the transistor 188.

A differentiating capacitor 192 serves to differentiate the wave existing at the junction terminal 190 and to impress the differentiated wave, comprising sharp pulses, one at each transition point in the gating wave, upon the base electrode 194 of a transistor 196, which transistor together with a similar transistor 198 makes up a flip-flop circuit which produces a replica of the gating wave that is characterized by sharper phase reversals than exist in the original gating wave. The thus sharpened gating wave is impressed upon the differential amplifier 66 (FIG. 3).

The differential amplifier 66 comprises on one side a train of transistors 90, 92, controllable by means of a voltage from the collector of the transistor 198 impressed upon the base 94 of the first transistor 90 of the train. The transistor train 90, 92 is connected between the supply voltage terminals +B and —B with a resistor 96 in series therewith between a junction 98 and the +B terminal. On the other side of the amplifier is shown another train of transistors 100, 102, controllable by means of a voltage from the collector of the transistor 196 impressed upon the base 104 of the transistor 100. The transistors 100, 102 are connected between the +B and —B terminals with a series resistor 106 between a junction 108 and +B. The junctions 98 and 108 are connected to opposite ends of the primary winding 110 of the saturable transformer 68, preferably with a capacitor 112 shunted across the terminals of the winding 110. The transistors in the differential amplifier 66 are shown as being all of the PNP type.

In the operation of the differential amplifier 66, two conditions occur alternately in time succession. In one condition, base 94 is at relatively negative potential, while at the same time the base 104 is relatively positive. This renders the transistors 90, 92 conductive and the transistors 100, 102 non-conductive. Accordingly, the junction 98 is rendered close to —B in potential and junction 108 close to +B, so that current flows through the winding 110 from junction 108 to junction 98. In the other condition, the circumstances are reversed and current flows through the winding 110 from junction 98 to junction 108.

The saturable transformer 68 is shown with the primary winding 110 coupled to secondary windings 116 and 118. Each secondary winding is marked with a dot at one end of the winding in accordance with a convention that indicates the relative direction of the winding with respect to the magnetic core. The winding 116 is shunted by a diode 125, the conductive direction of the diode being from the undotted end to the dotted end of the winding. The winding 118 is shunted by a diode 126, the conductive direction of the diode being from the dotted end to the undotted end of the winding. Each of the windings 116 and 118 is connected by an individual pair of leads across the control electrode and cathode of silicon controlled rectifiers 67 and 69 respectively.

Referring to the operation of the saturable transformer 68, it will be assumed that the polarities are such that when the current in the primary winding 110 is from right to left, the currents in each of the secondary windings will flow in the direction toward the dotted end of the respective winding, and that when the primary current is from left to right, the secondary currents will flow away from the dotted ends. It will be evident that when the primary current is from right to left, the secondary current in the winding 118 is short-circuited by the diode 126. However, at this time the winding 116 is effective to send current to the control electrode of the silicon controlled rectifier 69, rendering that rectifier conductive. The rectifier 69, so activated, provides a conductive path for welding current through the remote contact tube 26.

When the primary current in the winding 110 is from left to right the secondary winding 116 is short circuited by the diode 125 and winding 118 is effective to send a biasing impulse to the silicon controlled rectifier 67, rendering that recetifier conductive. The rectifier 67, so activated, provides a conductive path for welding current through the close-up contact tube 28.

Due to the saturable feature of the transformer 68, a pulse of primary current generates a corresponding pulse in the secondary circuit only up to such time as the core of the transformer becomes saturated, whereupon the secondary pulse stops. Thus the transformer generates secondary pulses which can be made of uniform duration regardless of the length of the primary pulse, provided the core becomes saturated before the end of each primary pulse. By choosing a suitable value of saturation flux for the transformer 68, gating pulses of suitable duration can be obtained which will trigger on the respective silicon controlled rectifiers while removing the triggering potential in each case well before the time when the rectifier is to be rendered non-conducting, so as not to interfere with the switching operation.

An air-cored autotransformer is provided having one winding 203 connected serially between the contact tube 28 and the anode of the rectifier 67 and having another winding 204 connected serially between the contact tube 26 and the anode of the rectifier 69. The windings 203 and 204 are coupled together with substantially unity coupling coefficient to aid in switching from one rectifier to the other with no material time loss while at the same time breaking the current in the rectifier which is to be extinguished.

It is well known that when a silicon controlled rectifier has been put into the conductive state by impressing the proper biasing voltage upon its control terminal, the device remains conductive regardless of any subsequent change in the magnitude or in the polarity of the biasing voltage on the control terminal. To render the device non-conductive, it is necessary to remove the anode potential that is producing the current through the device, or at least to reduce the anode potential below a certain threshold value. The rapid switching of the current from one rectifier to the other and the extinguishing of the initially conductive rectifier are accomplished simultaneously as follows. With the rectifier 67 in the conductive state, the full welding current from the source 32 is flowing through the winding 203 maintaining magnetic flux in both windings 203 and 204. It will be assumed that the rectifier 69 at this time is non-conductive, so that there is no material current in winding 204. If the rectifier 69 is suddenly made conductive, by application of the proper bias to its control terminal, a sudden rush of current occurs in winding 204. This rush of current generates a pulse in winding 203, which by proper poling of the windings 203 and 204 may be made to oppose the current in winding 203 and apply a reversed polarity pulse to the rectifier 67 to render that rectifier non-conductive.

When next the rectifier 67 is suddenly made conductive again by application of the proper bias to its control terminal, the rectifier 69 is switched off by a pulse generated in the winding 204 in similar fashion. The switching process repeats thereafter under the control of the gating pulses.

In practicing the invention, attention should be given to the observed effect of electrode extension beyond the contact tube (commonly called stick-out) upon the value of the transition current at which spray transfer starts. It is found that in the case of reverse-polarity direct current operation the transition current is reduced as the electrode extension is increased, with a substantially linear relationship between the transition current and the electrode extension. If it is desired to alternate between spray transfer and no metal transfer, it is necessary to avoid extending the electrode 20 so far beyond the contact tube 26 as to lower the transition current to such an extent that spray transfer will occur regardless of which of the contact tubes 26, 28 applies the welding power to the electrode.

The invention is useful to control the effective amount of stick-out without changing the physical location of either of the contact tubes 26 and 28. This is done by varying the ratio between the time period during which the welding current passes through the remote contact tube 26 to the time period during which the welding current passes through the contiguous contact tube 28.

While illustrative forms of apparatus and methods in accordance with the invention have been described and shown herein, it will be understood that numerous changes may be made without departing from the general principles and scope of the invention.

What is claimed is:

1. A method of controlling the energy input and metal transfer characteristic in an electric arc welding system using a consumable electrode and two contact members spaced apart from each other along the length of the electrode, one said member being adjacent to the arc-supporting tip of the electrode and the other said member being relatively remote from said tip, said method comprising the steps of feeding the substantially bare consumable electrode through said contact members into the arc region at a substantially constant feed speed, supplying welding current to said electrode through said contact members, and switching at a rapid repetitive rate the path which the welding current must follow back and forth between said contact members, whereby the variation in the effective resistance between the active contact member and the arc supporting tip of the electrode produced by the said switching effectively varies the welding current between a relatively high value and a relatively low value.

2. The method according to claim 1, in which the said relatively high value of welding current is effective to insure a spray mode of metal transfer from the electrode to the work, the said relatively low value of welding current is insufficient to provide any material metal transfer, and the duty cycle of the periodic switching is adjusted to provide a desired energy input to the weld pool.

3. The method according to claim 1, in which the said relatively high value of welding current is effective to sustain an electric arc between said electrode and the work and effective to cause some melting of the electrode but insufficient to cause any material metal transfer from the electrode to the work, the said relatively low value of welding current being insufficient to maintain an arc between said electrode and the work but effective to provide warming of said electrode, and the frequency of the said periodic switching is adjusted to provide a desired energy input to the weld pool.

4. An electric arc welding system employing a power source, employing a consumable electrode and means to feed said electrode toward a workpiece at a substantially constant feed rate wherein the improvement comprises a pair of contact members, one said contact member being located relatively close to the arc-supporting tip of the electrode and the other said contact member being located relatively remote from said tip, high speed repetitive switching means connected to each said contact members and adapted to receive current from the power source and route it to said electrode through said contact members, control means connected to the switching means including means for adjusting the frequency of alternation of the application of the welding current to said contact members and separately and independently adjustable means for determining the proportionate dwell time of the welding current in each said contact member.

References Cited
UNITED STATES PATENTS 2,167,565   7/1939   Erber _____ 219—130 X
3,010,012   11/1961   Tuthill.

JOSEPH V. TRUHE, Primary Examiner

J. G. SMITH, Assistant Examiner

U.S. Cl. X.R.

219—137